US011525502B2

(12) United States Patent
Guan et al.

(10) Patent No.: US 11,525,502 B2
(45) Date of Patent: Dec. 13, 2022

(54) CIRCULAR WAVE DRIVE

(71) Applicant: Circular Wave Drive Partners Inc., Columbus, OH (US)

(72) Inventors: Shan Guan, Dublin, OH (US); Ronald Joe Schoolcraft, Martinsville, IN (US); Scott Zerkle Barnes, Columbus, OH (US)

(73) Assignee: Circular Wave Drive Partners Inc., Columbus, OH (US)

( * ) Notice: Subject to any disclaimer, the term of this patent is extended or adjusted under 35 U.S.C. 154(b) by 299 days.

(21) Appl. No.: 16/900,922

(22) Filed: Jun. 14, 2020

(65) Prior Publication Data

US 2020/0393030 A1 Dec. 17, 2020

Related U.S. Application Data

(60) Provisional application No. 62/860,887, filed on Jun. 13, 2019, provisional application No. 62/981,101, filed on Feb. 25, 2020.

(51) Int. Cl.
*F16H 49/00* (2006.01)
*F16H 1/32* (2006.01)
*F16H 57/023* (2012.01)

(52) U.S. Cl.
CPC ............. *F16H 49/001* (2013.01); *F16H 1/32* (2013.01); *F16H 57/023* (2013.01); *F16H 2001/323* (2013.01)

(58) Field of Classification Search
CPC ........ F16H 49/001; F16H 1/32; F16H 57/023; F16H 2001/323

(Continued)

(56) References Cited

U.S. PATENT DOCUMENTS 1,405,986 A * 2/1922 Elbertz ................... F16H 48/10
475/174
3,196,713 A 7/1965 Robinson
(Continued)

FOREIGN PATENT DOCUMENTS

CN 2326784 Y 6/1999
CN 99111768 A 2/2001
(Continued)

OTHER PUBLICATIONS

International Search Report and Written Opinion in related application PCT/US20/37651, dated Sep. 1, 2020.
(Continued)

*Primary Examiner* — Ha Dinh Ho
(74) *Attorney, Agent, or Firm* — Thomas Y. Kendrick; Benjamen E. Kern; Kern Kendrick LLC

(57) ABSTRACT

A circular wave drive system is provided. In one aspect, the circular wave drive includes a compliant input ring gear having an inner surface having internal input ring gear teeth; an input cycloidal disc having an outer surface having external input cycloidal disc gear teeth oriented on the outer surface, and wherein the external input cycloidal disc gear teeth at least partially engage the internal input ring gear teeth; a compliant primary drive gear having an outer surface having external primary drive gear teeth; an eccentric motion generator including an eccentric portion and a non-eccentric portion and wherein a centerline of the eccentric portion and the non-eccentric portion are offset from one another; and an output cycloidal disc having an inner surface with internal output cycloidal disc teeth, and wherein the internal output cycloidal disc teeth at least partially engage the external primary drive gear teeth.

20 Claims, 20 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 3,198,035 | A | * | 8/1965 | Mueller .................. F16H 48/18 |
| | | | | 74/650 |
| 3,211,400 | A | | 10/1965 | Booth |
| 3,214,999 | A | | 11/1965 | Lapp |
| 3,459,072 | A | | 8/1969 | Shannon |
| 3,768,336 | A | * | 10/1973 | Wharton .................. F16H 48/11 |
| | | | | 475/248 |
| 4,604,916 | A | | 8/1986 | Distin, Jr. |
| 4,665,769 | A | * | 5/1987 | Parsons .................. F16H 48/10 |
| | | | | 475/174 |
| 4,674,351 | A | | 6/1987 | Byrd |
| 4,841,810 | A | | 6/1989 | Lew |
| 4,884,473 | A | | 12/1989 | Lew |
| 5,101,678 | A | | 4/1992 | Inui |
| 5,145,468 | A | | 9/1992 | Nagabhusan |
| 5,716,300 | A | | 2/1998 | Sammataro et al. |
| 5,820,504 | A | | 10/1998 | Geralde |
| 6,664,711 | B2 | | 12/2003 | Baudendistel |
| 6,736,028 | B2 | | 5/2004 | Ruttor et al. |
| 7,235,030 | B2 | | 6/2007 | Becker |
| 7,479,083 | B2 | | 1/2009 | Schmidt et al. |
| 7,552,664 | B2 | | 6/2009 | Bulatowicz |
| 7,673,598 | B2 | | 3/2010 | Schaefer et al. |
| 9,003,924 | B2 | | 4/2015 | Kanai |
| 9,321,595 | B2 | | 4/2016 | Wolters et al. |
| 9,400,035 | B1 | | 7/2016 | Edsinger et al. |
| 9,490,679 | B2 | | 11/2016 | Yamamoto et al. |
| 9,523,410 | B2 | | 12/2016 | Lohmann et al. |
| 9,657,813 | B2 | | 5/2017 | Tesar |
| 9,695,912 | B2 | | 7/2017 | Edsinger et al. |
| 9,808,357 | B2 | | 11/2017 | Langlois |
| 9,829,071 | B2 | | 11/2017 | Nakamura et al. |
| 9,869,383 | B2 | | 1/2018 | Sasaki |
| 9,874,300 | B2 | | 1/2018 | Hagen et al. |
| 9,919,875 | B2 | | 3/2018 | Paulides et al. |
| 10,190,666 | B2 | | 1/2019 | Noguchi et al. |
| 10,260,606 | B2 | | 4/2019 | Hoefken |
| 10,415,672 | B2 | | 9/2019 | Salisbury |
| 10,422,414 | B2 | | 9/2019 | Ho et al. |
| 10,513,029 | B2 | | 12/2019 | Krumbacher et al. |
| 10,655,715 | B2 | | 5/2020 | Hoefken |
| 10,704,650 | B2 | | 7/2020 | Rey et al. |
| 10,767,733 | B2 | | 9/2020 | Sun et al. |
| 10,927,932 | B2 | | 2/2021 | Hoefken |
| 11,015,685 | B2 | | 5/2021 | Hoefken et al. |
| 11,028,910 | B2 | | 6/2021 | Hoefken |
| 11,125,301 | B1 | * | 9/2021 | Guan .................. F16H 1/32 |
| 2006/0283289 | A1 | | 12/2006 | Baudendistel et al. |
| 2012/0204674 | A1 | | 8/2012 | Lundberg et al. |
| 2013/0049508 | A1 | | 2/2013 | Willems |
| 2015/0345608 | A1 | | 12/2015 | Zheng |
| 2015/0354667 | A1 | | 12/2015 | Tesar |
| 2016/0201783 | A1 | | 7/2016 | Miyake et al. |
| 2016/0298746 | A1 | | 10/2016 | Kiyono et al. |
| 2019/0047610 | A1 | | 2/2019 | Rey |
| 2019/0136946 | A1 | | 5/2019 | Ray et al. |
| 2019/0170228 | A1 | | 6/2019 | Hoefken |
| 2020/0011400 | A1 | | 1/2020 | Tory |
| 2021/0285528 | A1 | | 9/2021 | Hoefken et al. |

FOREIGN PATENT DOCUMENTS

| | | | |
|---|---|---|---|
| CN | 1506594 | | 6/2004 |
| CN | 1616847 A | | 5/2005 |
| CN | 206072245 U | | 4/2017 |
| EP | 0020314 | | 12/1980 |
| EP | 0393285 | | 10/1990 |
| EP | 0474897 | | 3/1992 |
| FR | 3050504 A1 * | 10/2017 | ............... B62D 5/04 |
| JP | 2011241974 A | | 12/2011 |
| JP | 201927519 A | | 2/2019 |
| JP | 2020040793 | | 3/2020 |
| WO | 2017/074478 A1 | | 5/2017 |
| WO | 2019231469 | | 12/2019 |
| WO | 2020101716 | | 5/2020 |
| WO | 2021029867 | | 2/2021 |
| WO | 2021183566 | | 9/2021 |

OTHER PUBLICATIONS

International Search Report and Written Opinion in related application PCT/US15/33421, dated Aug. 21, 2015.

International Search Report and Written Opinion in related application PCT/US20/37652, dated Sep. 1, 2020.

Matt Freund, Bet You Can't Find a Use for This 11-Million-to-1 Gearbox, MAKE, published Jul. 8, 2015, acccessed online on Sep. 10, 2020 at https://makezine.com/2015/07/08/bet-cant-find-use-11-million-1-gearbox/.

Sumitomo Drive Technologies, Cyclo Drive 6000 Operating Manual, published Aug. 2019, accessed online on Sep. 10, 2020 at https://emeia.sumitomodrive.com/en-de/product/cyclo-drive-6000-gearmotor#documentation.

On Staff, Low backlash for the long haul, DesignNews, published Aug. 20, 2001, accessed online on Sep. 10, 2020 at https://www.designnews.com/low-backlash-long-haul.

Extended European Search Report in European Patent Application 20822485.7, dated May 13, 2022.

European Examination Report in European Patent Application 15799610.9, dated Jul. 14, 2022.

* cited by examiner

600

610 Selecting a desired reduction ratio for the circular wave drive

620 Providing a circular wave drive including: an input ring gear having internal gear teeth (a); an input cycloidal disc having external gear teeth (b), the input cycloidal disc gear teeth at least partially engaging the input ring gear teeth; a primary drive gear having external gear teeth (d), the primary drive gear fixed to the input cycloidal disc; an output cycloidal disc having internal gear teeth (c), and the output cycloidal disc teeth at least partially engaging the primary drive gear teeth

630 Calculating a reduction ratio using the equation:
Reduction Ratio =

$$\left[\frac{a}{b}\left(\frac{c-d}{c}\right) - \frac{a-b}{a}\right]^{-1} : 1$$

wherein the number of input ring gear teeth is (a),
wherein the number of input cycloidal gear teeth is (b),
wherein the number of output cycloidal disc teeth is (c),
wherein the number of primary drive gear teeth is (d).

FIG. 6

CIRCULAR WAVE DRIVE

CROSS-REFERENCE TO RELATED APPLICATIONS

This application claims priority to U.S. Provisional Patent Application No. 62/860,887, filed Jun. 13, 2019 and U.S. Provisional Patent Application No. 62/981,101, filed Feb. 25, 2020, each of which is incorporated by reference herein in its entirety.

BACKGROUND

A number of devices for transmitting power and reducing motor output speed are currently known. Two such devices are the harmonic drive and the cycloidal drive.

The more well-known of these devices is the harmonic drive, having been introduced in the 1950's and currently being in wide-spread use. However, the harmonic drive requires the use of a flexspine, which is deliberately deformed repeatedly during operation of the harmonic drive. This deformation of the flexspine fatigues the material from which the flexspine is constructed, which fatigue limits the speed reduction and torque transfer that may be achieved with a harmonic drive.

Typical versions of the cycloidal drive are of relatively complex construction and operation. The cycloidal drive requires many moving parts, each of which may be a point of failure. The eccentric rotation of the cycloidal disc also produces an undesirable vibration that may be transmitted through the input and output shafts if not compensated for. Finally, contact between the output rollers and the receiving holes in the cycloidal disc may also lead to the wear of both components.

Additionally, where toothed gears are utilized in the system to achieve the desired reduction ratios, gear backlash may be difficult to properly establish. As such, toothed elements with compliant (i.e., elastically deformable) gear portions may be included to permit the gear tooth interface to deflect slightly to obtain the necessary backlash for optimal functioning.

What is needed is a power transmission/speed reduction device that does not suffer from the described drawbacks of known harmonic and cycloidal drives. Such a device may also offer a more simplistic construction, as well as a long life.

SUMMARY

In one aspect, a circular wave drive is provided, the circular wave drive comprising: a compliant input ring gear having an inner surface, wherein the compliant input ring gear includes internal input ring gear teeth oriented on the inner surface; an input cycloidal disc having an outer surface, wherein the input cycloidal disc includes external input cycloidal disc gear teeth oriented on the outer surface, and wherein the external input cycloidal disc gear teeth at least partially engage the internal input ring gear teeth; a compliant primary drive gear having an outer surface, wherein the primary drive gear includes external primary drive gear teeth oriented on the outer surface; an eccentric motion generator, wherein the eccentric motion generator includes an eccentric portion and a non-eccentric portion and wherein a centerline of the eccentric portion and the non-eccentric portion are offset from one another; and an output cycloidal disc having an inner surface, wherein the output cycloidal disc includes internal output cycloidal disc teeth oriented on the inner surface, and wherein the internal output cycloidal disc teeth at least partially engage the external primary drive gear teeth.

In another aspect, a circular wave drive is provided, the circular wave drive comprising: a compliant input ring gear having an inner surface, wherein the compliant input ring gear includes internal input ring gear teeth oriented on the inner surface, and wherein the compliant input ring gear includes a non-compliant portion containing the input ring gear teeth, and an input ring gear mounting flange, wherein the non-compliant portion and the input ring gear mounting flange are connected by a compliant wall; an input cycloidal disc having an outer surface, wherein the input cycloidal disc includes external input cycloidal disc gear teeth oriented on the outer surface, and wherein the external input cycloidal disc gear teeth at least partially engage the internal input ring gear teeth; a compliant primary drive gear having an outer surface, wherein the primary drive gear includes external primary drive gear teeth oriented on the outer surface, and wherein the primary drive gear includes a hub, a compliant radial wall extending radially outwardly from the hub, and a complaint rib formed by at least one of a first relief groove or a second relief groove, and wherein the compliant rib connects the external primary drive gear teeth to the compliant radial wall; an eccentric motion generator, wherein the eccentric motion generator includes an eccentric portion and a non-eccentric portion and wherein a centerline of the eccentric portion and the non-eccentric portion are offset from one another; and an output cycloidal disc having an inner surface, wherein the output cycloidal disc includes internal output cycloidal disc teeth oriented on the inner surface, and wherein the internal output cycloidal disc teeth at least partially engage the external primary drive gear teeth.

BRIEF DESCRIPTION OF THE DRAWINGS

The accompanying figures, which are incorporated in and constitute a part of the specification, illustrate various example systems, apparatuses, and methods, and are used merely to illustrate various example aspects. In the figures, like elements bear like reference numerals.

FIG. 6 is a flowchart illustrating an example method for determining a reduction radio of a circular wave drive.

DETAILED DESCRIPTION

Figure 1A:
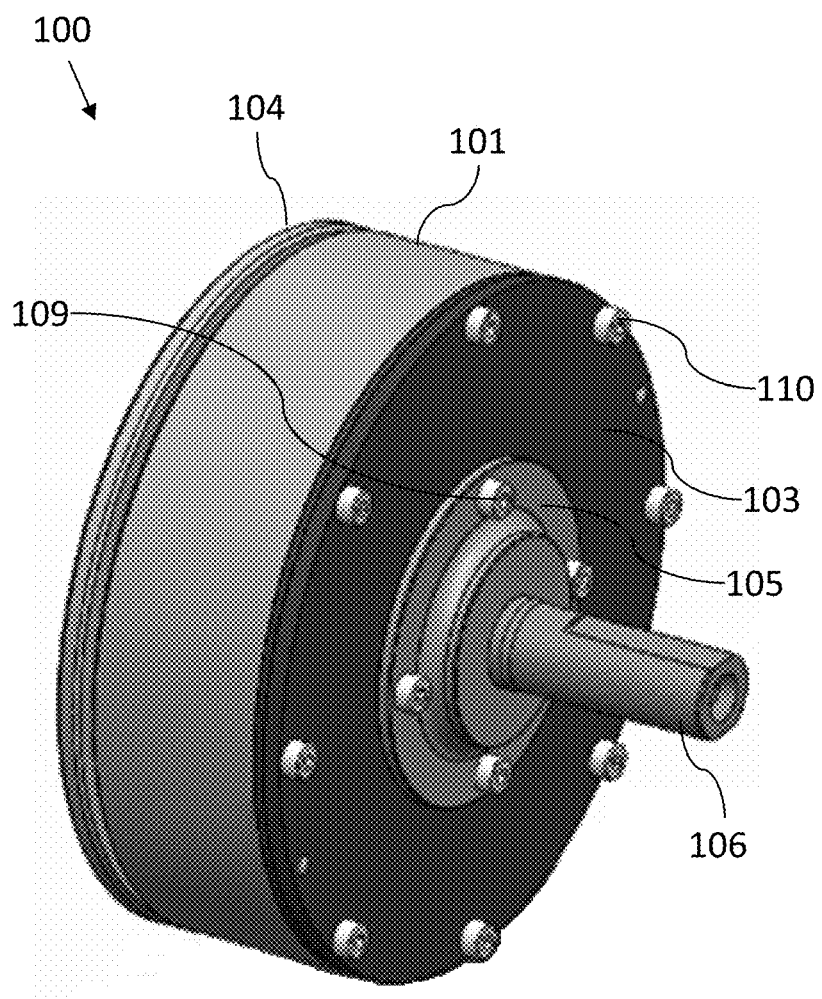
FIG. 1A is a perspective view of an input end of one example aspect of a circular wave drive 100.

Example circular wave drive aspects disclosed herein may be of simpler construction than known harmonic and cycloidal drives. Example circular wave drive aspects disclosed herein may also be compact in size, offer a large range of speed reduction ratios, are not reverse-drivable, and operate with little to no backlash. Example circular wave drive aspects disclosed herein are devoid of rollers commonly found in cycloidal drives.

Generally speaking, example circular wave drive aspects disclosed herein may include a housing having a circular chamber therein. The housing may include a cover that closes a cavity in the housing so as to form the enclosed circular chamber. The housing may be formed of more than one element, selectively fitted together. Teeth may be disposed along an inside circular wall of the chamber (input ring gear). A ring-shaped wheel (input cycloidal disc) may reside within the chamber. The ring-shaped wheel may be integral to, or removably attached to, the housing. The wheel may include external teeth that mesh with the teeth located along the circular inner wall of the housing. The wheel diameter may be smaller than the chamber diameter, such that only a portion of the wheel teeth are meshed with the internal housing teeth at any given time. The wheel may be laminated to a second wheel (primary drive gear), which may also include external teeth. The second wheel external teeth may mesh with internal teeth disposed along a portion of an inner wall of an output gear element (output cycloidal disc).

Example circular wave drive aspects disclosed herein may also include a wave generator (eccentric motion generator). The wave generator may include an eccentric motion generator having an eccentric portion configured to cause translation of one or more elements (e.g., input cycloidal disc and primary drive gear) during rotation of the eccentric motion generator. The eccentric motion generator, including the eccentric portion, may have a cross-section that is circular in shape. The eccentric portion may be offset from the central axis of the remainder of the eccentric motion generator so as to impart an eccentric motion to elements in contact with the eccentric motion generator when the eccentric motion generator is rotated. The non-eccentric portion of the wave generator may extend through an opening in the housing, which may include an input ring gear, either removably or integrally attached to the housing.

Example circular wave drive aspects may also employ an output drive element. The output drive element may include a circular-shaped disc. The output drive element may be coaxial with the eccentric motion generator. The output element portion may be oriented on an opposite side of the circular wave drive from the eccentric motion generator, or alternatively, the output element portion may be oriented on the same side of the circular wave drive as the eccentric motion generator. Both the eccentric motion generator and the output element portion of the output drive element may pass through bearings.

In operation, the eccentric motion generator of the wave generator may be connected to a rotation-imparting actuator, such as an electric drive motor. The actuator may impart rotational motion to the wave generator, which may cause the eccentric portion thereof to rotate within the input cycloidal disc and the primary drive gear. Rotation of the eccentric portion may cause a rotation of the input cycloidal disc along the inner wall of the input ring gear. Rotation of the eccentric portion and the input cycloidal disc may cause rotation of the output cycloidal disc, which may cause rotation of the primary drive gear, which may cause rotation of the output drive element at a reduced speed relative to the rotational velocity of the eccentric motion generator (reduced by the reduction ratio).

Because the external peripheral surface of the eccentric portion of the eccentric motion generator and the mating surface of the inner wall of the input cycloidal disc may be separated by a bearing, the coefficient of friction between the eccentric portion of the eccentric motion generator and the mating surface of the inner wall of the input cycloidal disc may be extremely low. Consequently, the input cycloidal disc may not rotate in turn with the eccentric motion generator eccentric portion but, rather, may slide along the peripheral surface of the eccentric motion generator eccentric portion. This may result in an input cycloidal disc rotational speed that is less than the rotational speed of the eccentric motion generator and associated actuator. The overall speed reduction between the input and output side of the circular wave drive may depend upon at least one of: the diameter of the wave generator, the number of gear teeth of the input cycloidal disc, the number of gear teeth of the input ring gear, the number of gear teeth of the primary drive gear, and the number of gear teeth of the output cycloidal disc. The overall speed reduction may additionally depend upon the diameters of the various elements noted immediately above. A large diameter may not necessarily have more teeth than a small diameter when two surfaces meet. With various combinations of the diameters and the numbers of teeth, the magnitude of the speed reduction may cover a large range, for example from 8:1 to 10,000:1, which may not be possible through the use of existing devices.

Figure 1B:
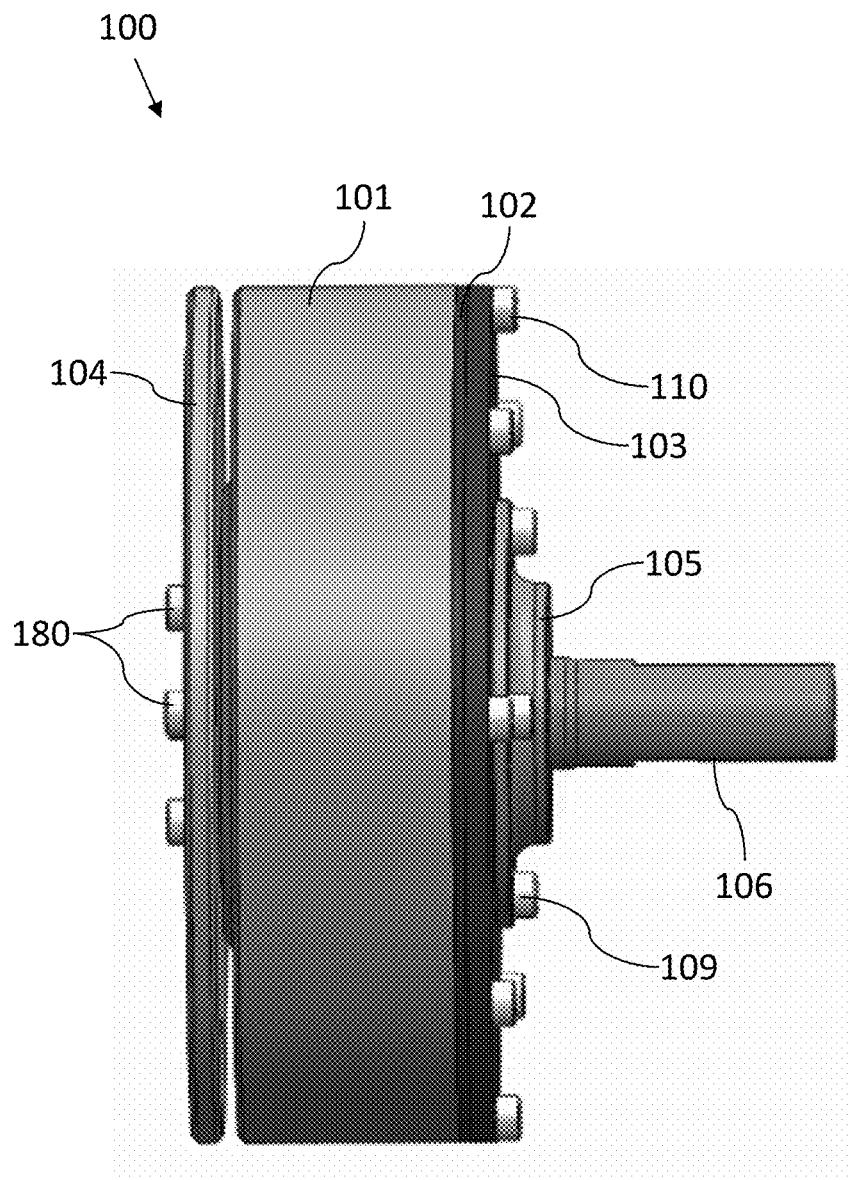
FIG. 1B is a side elevation view of one example aspect of circular wave drive 100.
Figure 1C:
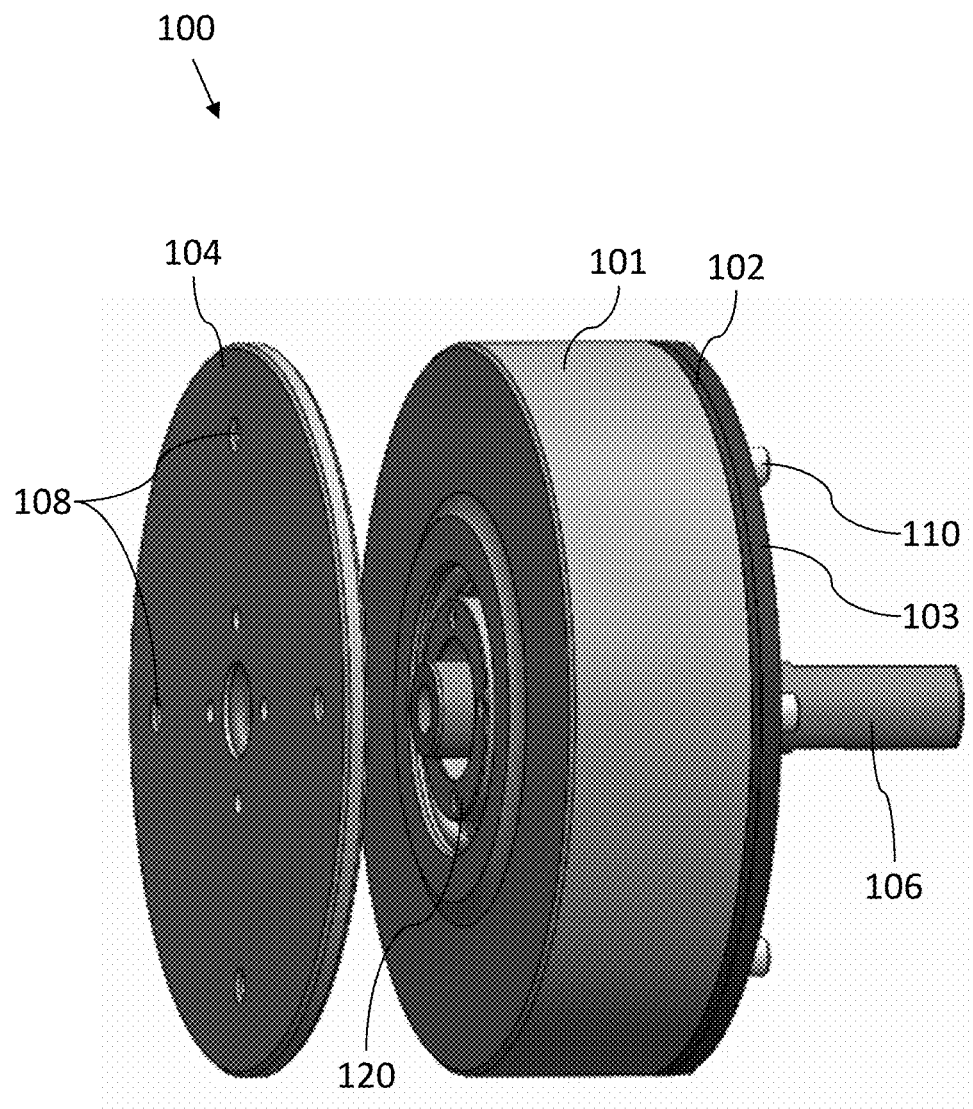
FIG. 1C is a partially exploded perspective view of an output end of one example aspect of circular wave drive 100.

FIGS. 1A-1C illustrate one example aspect of a circular wave drive 100. Circular wave drive 100 may include a housing 101 and an output drive element 104. Circular wave drive 100 may include an eccentric motion generator 106.

Circular wave drive 100 may be configured to receive a rotational input and, via interactions between various elements, output a rotational output reduced by a reduction ratio as described further herein. Circular wave drive 100 may be made of any of a variety of materials, including for example: metals such as steel or alloys; polymers; or organic materials. Circular wave drive 100 may be made of any material having sufficient strength, hardness, or durability to perform a rotational reduction for a desired duration of intended use. Any of the various elements of circular wave drive 100 may be formed through any of a variety of methods, including for example: machining, 3D printing/additive manufacturing, or forging.

Housing 101 and output drive element 104 may be rotatably connected to one another, such that one may rotate relative to the other. Housing 101 and output drive element 104 may be rotatably connected to one another, with a primary drive gear/housing bearing (shown as element 268 in FIGS. 2F and 2G) oriented therebetween.

Circular wave drive 100 may include an end plate 103 connected to housing 101. End plate 103 may be connected to housing 101 via one or more fastener 110. Circular wave drive 100 may include a flange plate 105 encircling eccentric motion generator 106. Flange plate 105 may be connected to end plate 103 via one or more fastener 109.

As illustrated in FIG. 1B, circular wave drive 100 may include an input ring gear 102. Input ring gear 102 may be oriented between end plate 103 and housing 101. Input ring gear 102 may be connected to one or both of housing 101 and end plate 103. Input ring gear 102 may be connected to one or both of housing 101 and end plate 103 via at least one fastener 110. Input ring gear 102 may be sandwiched between end cap 103 and housing 101, and secured via at least one fastener 110 extending through at least one aperture in end cap 103, through at least one mounting aperture (shown as element 384 in FIGS. 3A and 3C-3E), and into at least one aperture in housing 101. Housing 101 may include one or more blind hole for accepting fastener 110, which may be, for example, a threaded fastener.

Output drive element 104 may be connected to a primary drive gear 120. Output drive element 104 may be connected to a primary drive gear 120 via at least one fastener 180. At least one fastener 180 may extend through at least one output drive element 104 and into at least aperture in primary drive gear 120.

Eccentric motion generator 106 may be a shaft having a substantially circular cross-section. Eccentric motion generator 106 may include an eccentric portion (shown as element 207) as described more fully below. Eccentric motion generator 106 may be operatively connected to a rotation-inducing element, including for example, a rotational actuator configured to impart rotation to eccentric motion generator 106.

Eccentric motion generator 106 is not directly connected to output drive element 104. That is, eccentric motion generator 106 and output drive element 104 are only connected to one another through intermediary gear train elements. Eccentric motion generator 106 and output drive element 104 rotate relative to one another pursuant to a reduction ratio, as further described below. In this manner, an input rotational speed is reduced by circular wave drive 100 and output through output drive element 104.

Either of housing 101 and end plate 103 may include any of a variety of elements permitting the mounting or otherwise arresting of housing 101 and/or end plate 103 relative to another object, such as a structural element of a mechanical component, the ground, a machine, and the like.

Output drive element 104 may include at least one output drive element mounting element 108. Output drive element mounting element 108 may include an aperture, perforation, boss, threaded blind hole, non-threaded blind hole, tab, and the like. Output drive element mounting element 108 may include any of a variety of elements permitting the mounting or otherwise arresting of output drive element 104 relative to another object, such as a structural element of a mechanical component, the ground, a machine, and the like.

FIGS. 2A-2II illustrate one example aspect of a circular wave drive 200. Circular wave drive 200 may include a housing 201, an eccentric motion generator 206 having an eccentric portion 207, an input cycloidal disc 218, a tie plate 219, a primary drive gear 220, an output cycloidal disc 224, an eccentric motion generator/input cycloidal disc bearing 226, and an eccentric motion generator/output drive element bearing 230.

Housing 201 may include a substantially hollow interior configured to accept all of the aforementioned elements. Eccentric motion generator 206 may extend substantially through housing 201, and through each of the aforementioned elements.

Eccentric motion generator 206 may include an eccentric portion 207 extending radially outwardly from the non-eccentric remainder of eccentric motion generator 206. Eccentric portion 207 may have a centerline that is offset from the centerline of the non-eccentric remainder of eccentric motion generator 206. That is, the centerline of eccentric portion 207 is parallel to, and offset from, the centerline of the non-eccentric portion of eccentric motion generator 206. The centerline of the non-eccentric portion of eccentric motion generator 206 is collinear with the axis of rotation of eccentric motion generator 206.

Input ring gear teeth 232, input cycloidal disc gear teeth 234, external primary drive gear teeth 236, and internal output cycloidal disc teeth 238 may each have a tooth height.

Input cycloidal disc 218 may include a hollow center portion, such that disc 218 is in the shape of an annulus. Input cycloidal disc 218 may include a friction element, which may be exterior input cycloidal disc gear teeth 234, about its radially outer edge.

Output cycloidal disc 224 may include a hollow center portion, such that gear 224 is in the shape of an annulus. Output cycloidal disc 224 may include a friction element, which may be internal output cycloidal disc teeth 238, about its radially inner edge.

Input cycloidal disc 218 and output cycloidal disc 224 may be directly connected to one another in a concentric configuration, and thus rotate together in a 1:1 ratio. Input cycloidal disc 218 and output cycloidal disc 224 may be connected to one another via tie plate 219 in a concentric configuration, and thus rotate together in a 1:1 ratio. Fasteners, such as screws, bolts, or rivets, may connect input cycloidal disc 218 to output cycloidal disc 224, either directly or through tie plate 219.

One or both of eccentric motion generator/input cycloidal disc bearing 226, and eccentric motion generator/output drive element bearing 230 may be rolling element bearings. The inner race of eccentric motion generator/input cycloidal disc bearing 226 may connect directly to, and encircle, eccentric portion 207 of eccentric motion generator 206, while the outer race of eccentric motion generator/input cycloidal disc bearing 226 may connect directly to, and be encircled by, input cycloidal disc 218. The inner race of eccentric motion generator/output drive element bearing 230 may connect directly to, and encircle, eccentric motion generator 206, while the outer race of eccentric motion generator/output drive element bearing 230 may connect directly to, and be encircled by, primary drive gear 220.

Primary drive gear 220 may include a hollow center portion, such that primary drive gear 220 is in the shape of an annulus. Primary drive gear 220 may include a friction element, which may be external primary drive gear teeth 236, about its radially outer edge.

Figure 2A:
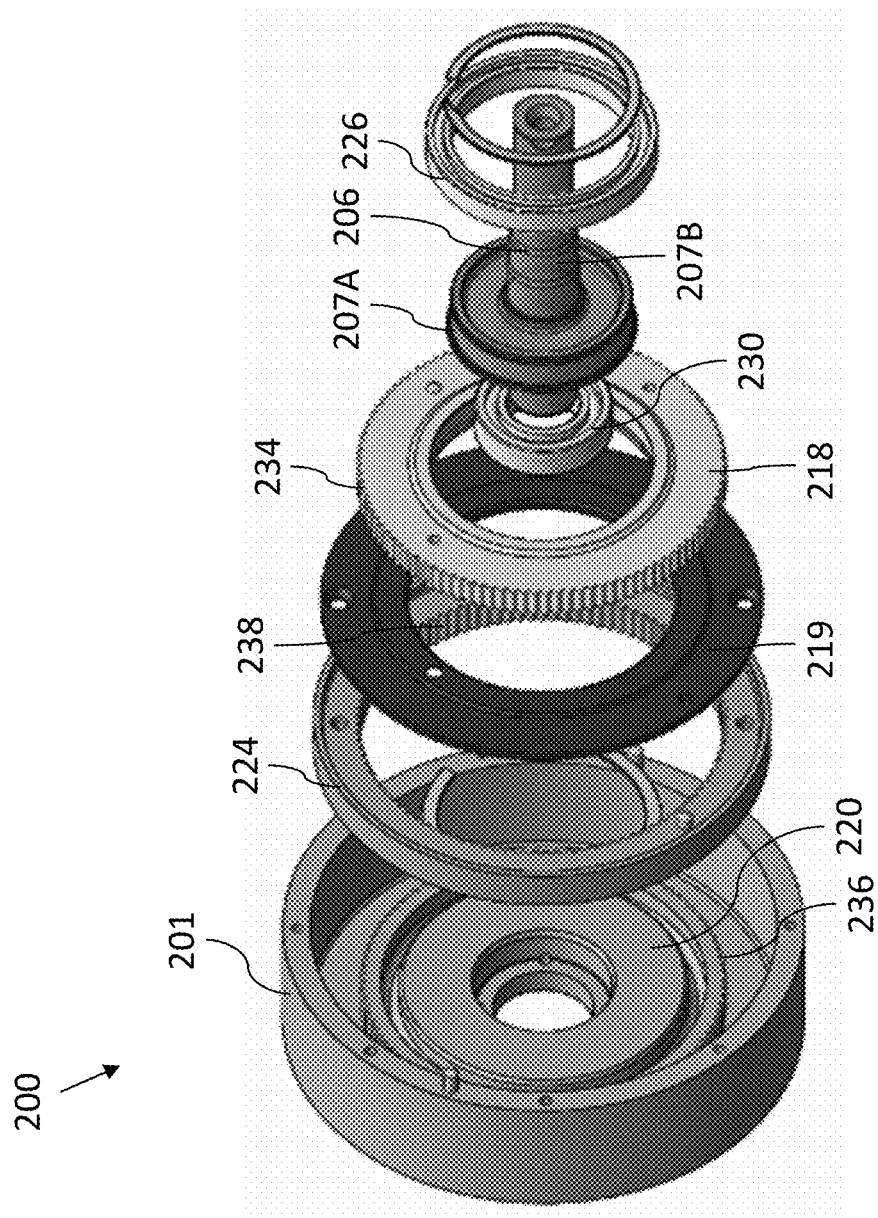
FIG. 2A is an exploded perspective view of an input end of one example aspect of a circular wave drive 200.
Figure 2B:
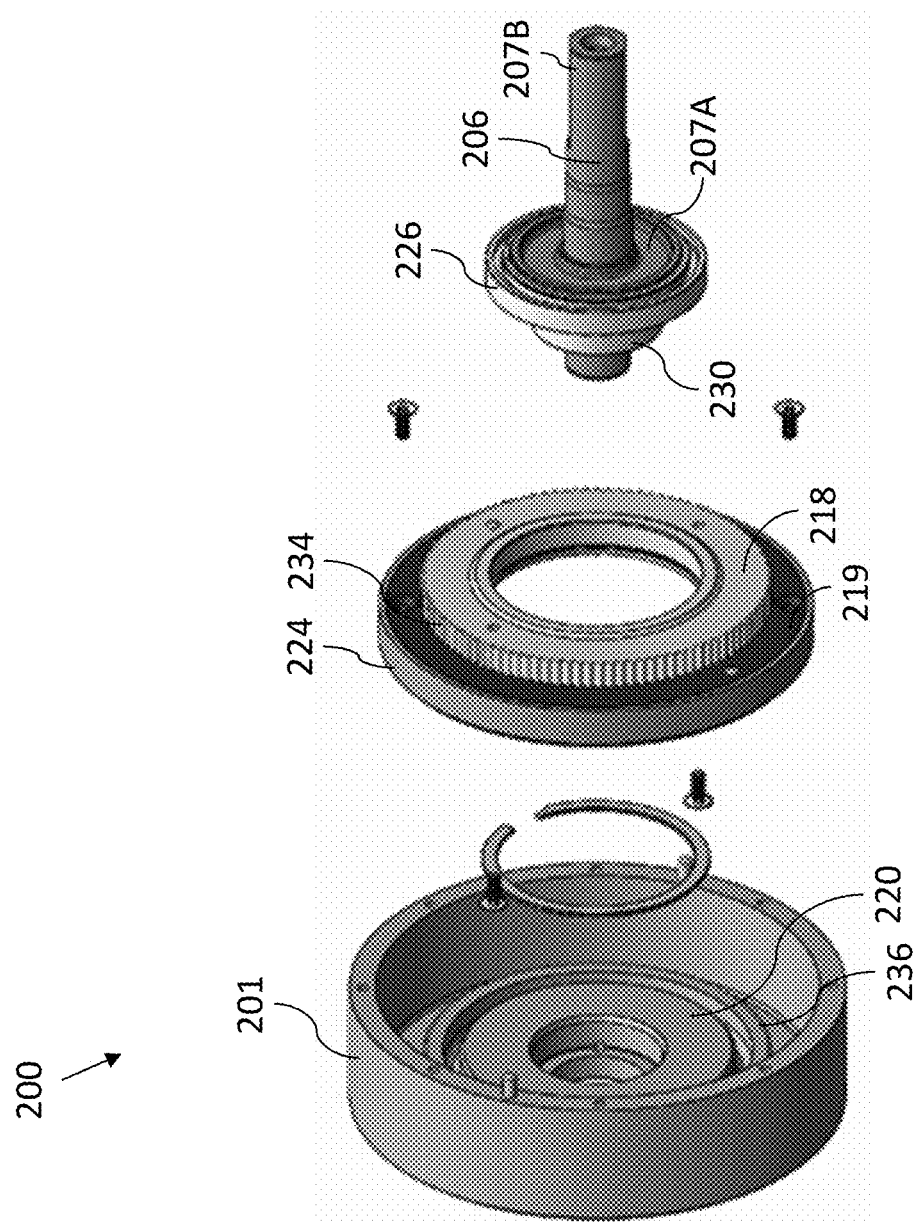
FIG. 2B is a partially exploded perspective view of an input end of one example aspect of circular wave drive 200.
Figure 2C:
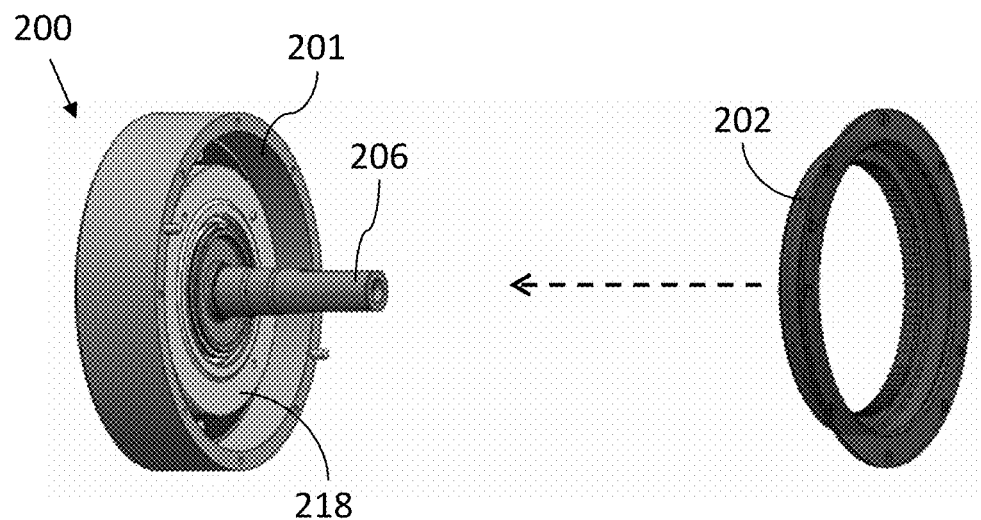
FIG. 2C is a partially exploded perspective view of an input end of one example aspect of circular wave drive 200.
Figure 2D:
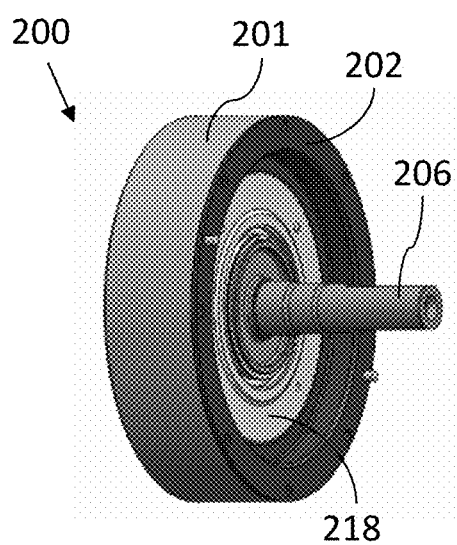
FIG. 2D is a perspective view of an input end of one example aspect of circular wave drive 200.
Figure 2E:
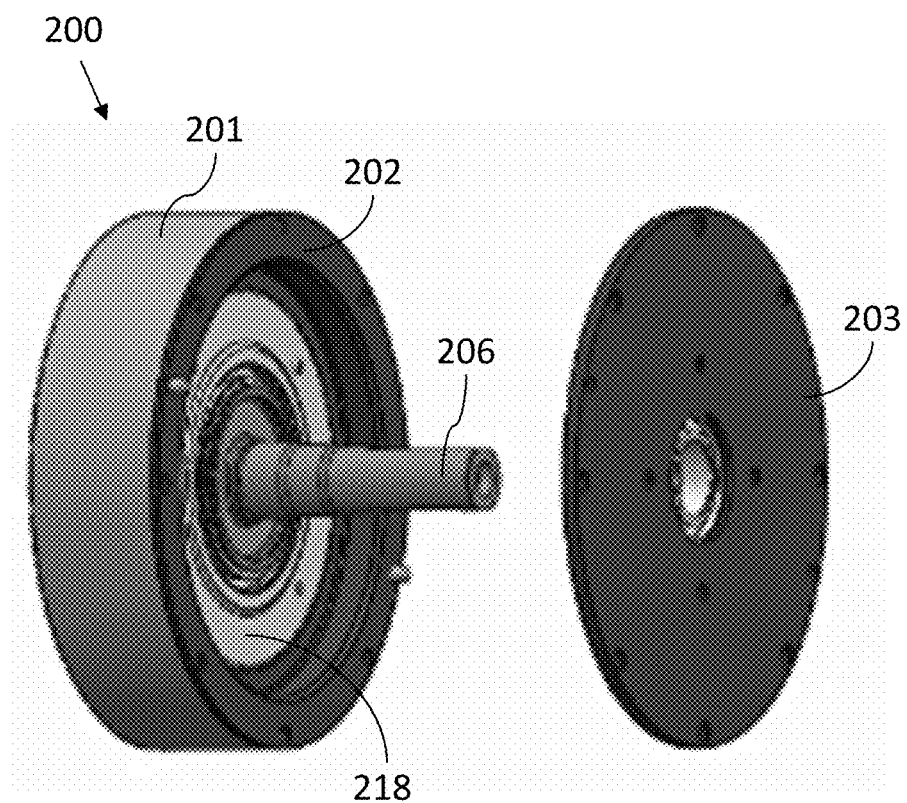
FIG. 2E is a partially exploded perspective view of an input end of one example aspect of circular wave drive 200.

As illustrated in FIGS. 2C and 2D, an input ring gear 202 may be mounted to housing 201. As illustrated in FIG. 2E, an end plate 203 may be mounted to input ring gear 202, sandwiching input ring gear 202 between end plate 203 and housing 201.

Figure 2F:
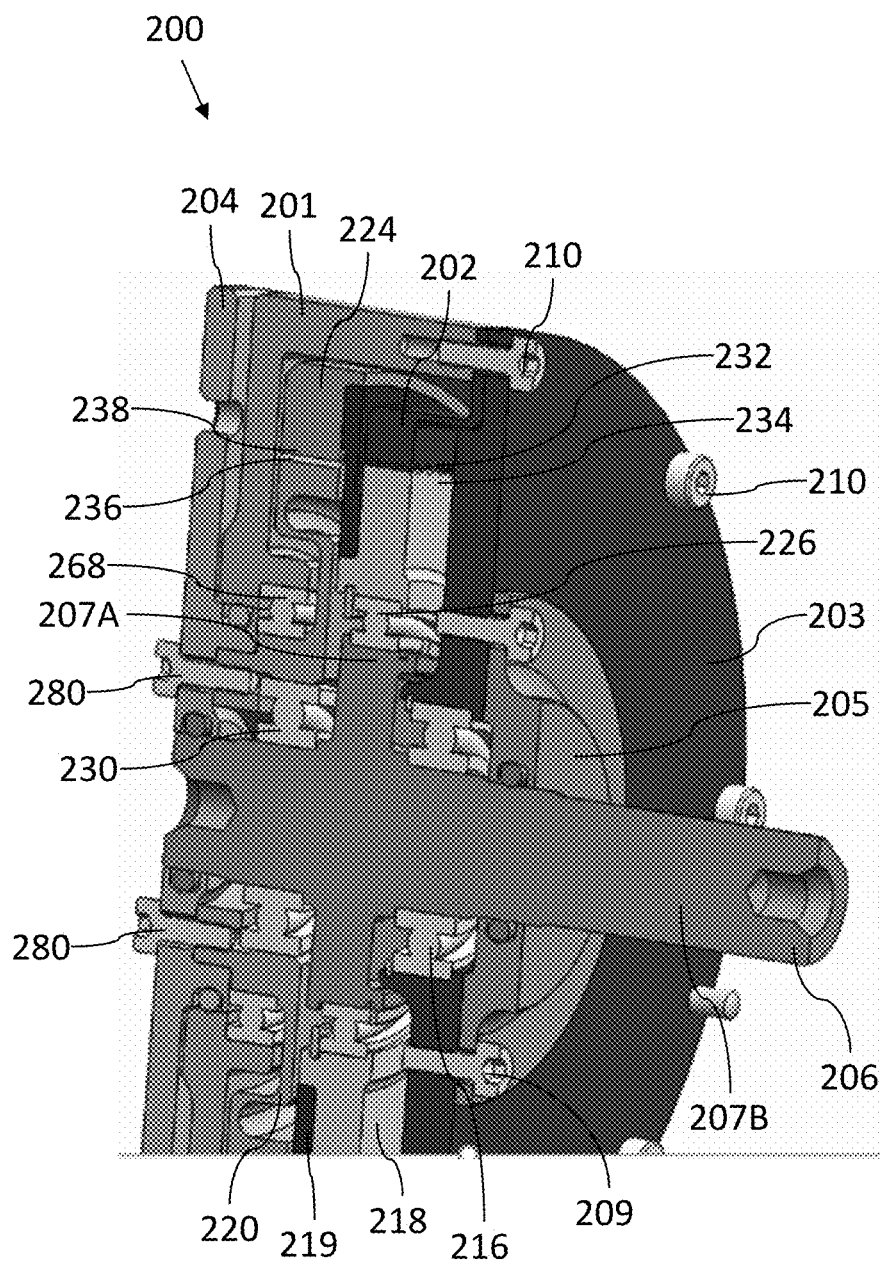
FIG. 2F is a sectional perspective view of an input end of one example aspect of circular wave drive 200.
Figure 2G:
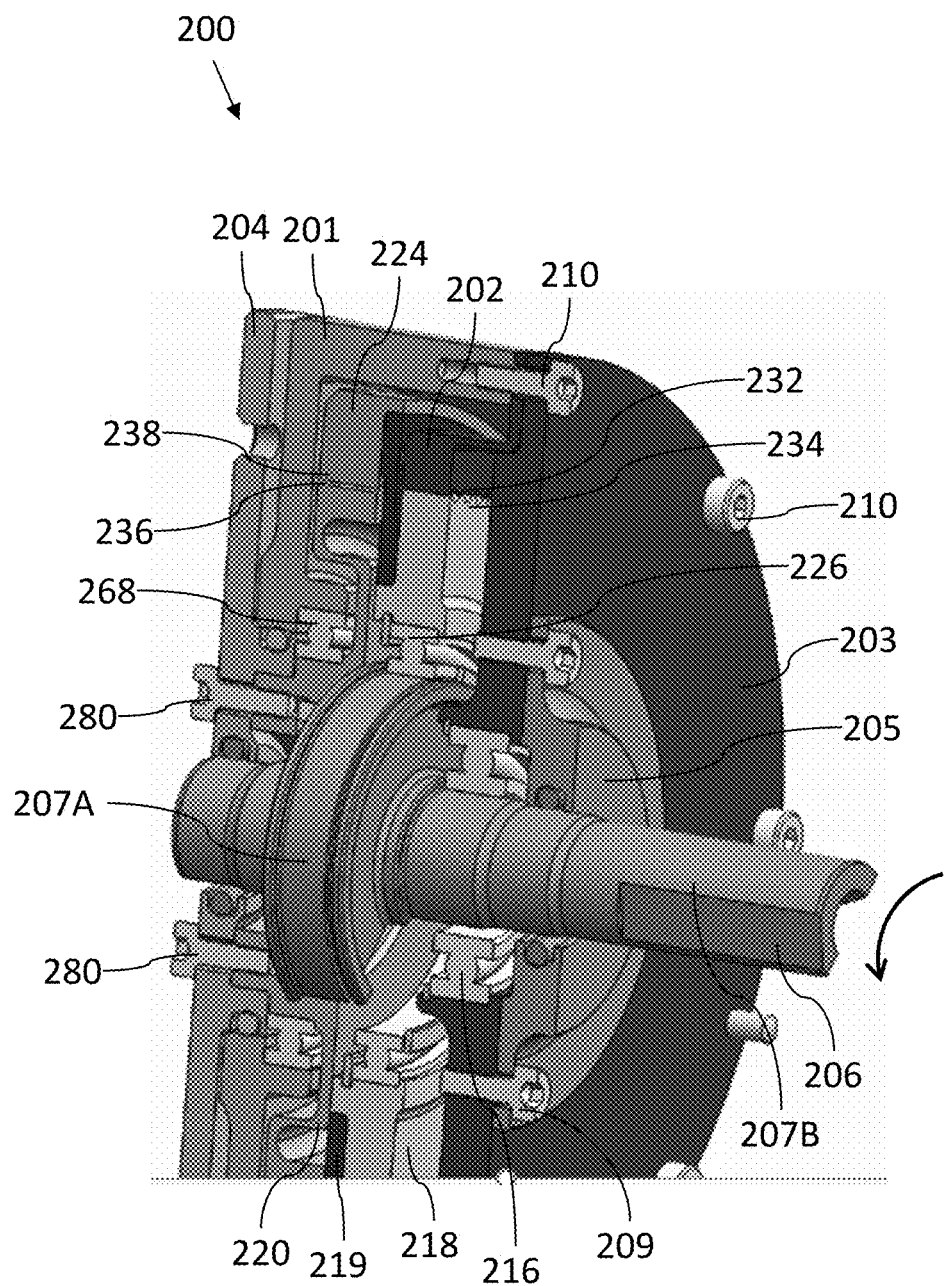
FIG. 2G is a sectional perspective view of an input end of one example aspect of circular wave drive 200.

FIGS. 2F-2G illustrate sectional views of an assembled circular wave drive 200. FIG. 2G illustrates a view wherein eccentric motion generator 206 is rotated approximately 120 degrees counter-clockwise.

The assembled circular wave drive 200 additionally includes a flange plate 205 connected to end plate 203 via at least one fastener 209. End plate 203 may be connected to housing 201 via at least one fastener 210. At least one fastener 210 may Circular wave drive 200 may include an eccentric motion generator bearing 216. Eccentric motion generator bearing 216 may be a rolling element bearing. The inner race of eccentric motion generator bearing 216 may connect directly to, and encircle, eccentric motion generator 206, while the outer race of eccentric motion generator bearing 216 may connect directly to, and be encircled by, end plate 203.

Circular wave drive 200 may include a primary drive gear/housing bearing 268. Primary drive gear/housing bearing 268 may be a rolling element bearing. The inner race of primary drive gear/housing bearing 268 may connect directly to, and encircle, a hub portion of primary drive gear 220, while the outer race of primary drive gear/housing bearing 268 may connect directly to, and be encircled by, housing 201.

It is understood that each of the aforementioned bearings allow rotation of the element connected to the inner race of the bearing, and the element connected to the outer race of the bearing, relative to one another.

Circular wave drive 200 may include an output drive element 204, connected directly to primary drive gear 220 via at least one fastener 280.

When assembled in circular wave drive 200, input ring gear teeth 232 engage input cycloidal disc gear teeth 234, and via this tooth engagement and the eccentric motion of input cycloidal disc 218 (imparted via its engagement with eccentric portion 207), input ring gear 202 and input cycloidal disc 218 rotate relative to one another about an axis parallel to the axis of rotation of eccentric motion generator 206.

When assembled in circular wave drive 200, external primary drive gear teeth 236 engage internal output cycloidal disc teeth 238, and via this tooth engagement and the eccentric motion of output cycloidal disc 224 (imparted via its engagement with eccentric portion 207), output cycloidal drive 220 rotates relative to output cycloidal disc 224 about an axis parallel to the axis of rotation of eccentric motion generator 206.

Via the aforementioned tooth engagements, rotation of eccentric motion generator 206 causes rotation of eccentric portion 207, which causes input cycloidal disc 218 and thus output cycloidal disc 224 (which are connected to one another) to rotate. The rotation of output cycloidal disc 224 causes primary drive gear 220 to rotate, and this rotation of primary drive gear 220 causes output drive element 204 to rotate as the two are connected directly to one another via at least one fastener 280.

Stated differently, in practice, a rotational force may be input to eccentric motion generator 206, which may cause rotation of eccentric motion generator 206 and eccentric portion 207. Eccentric motion generator 206 may be permitted to rotate within end plate 203 via eccentric motion generator bearing 216. Eccentric portion 207 of eccentric motion generator 206 may engage input cycloidal disc 218 via eccentric motion generator/input cycloidal disc bearing 226, which eccentric rotation may cause input cycloidal disc 218 to engage and rotate along input ring gear teeth 232. Rotation of input cycloidal disc 218 may cause a like eccentric rotation of output cycloidal disc 224. Eccentric rotation of output cycloidal disc 224 may cause primary drive gear 220 to engage and rotate along output cycloidal disc 224. Rotation of primary drive gear 220 may cause rotation of output drive element 204, and the two may be configured to rotate relative to housing 201 via primary drive gear/housing bearing 268. The speed of rotation of output drive element 204 may be reduced relative to the speed of rotation of eccentric motion generator 206 pursuant to a reduction ratio.

Circular wave drive 200 may include various seals to allow a lubricant, such as oil, to be contained within its interior to aid in operation and reduction of wear.

The non-eccentric portion of eccentric motion generator 206 may be concentric with input ring gear 202, primary drive gear 220, and output drive element 204. Eccentric portion 207 may be concentric with input cycloidal disc 218, output cycloidal disc 224, and tie plate 219.

Figure 2H:
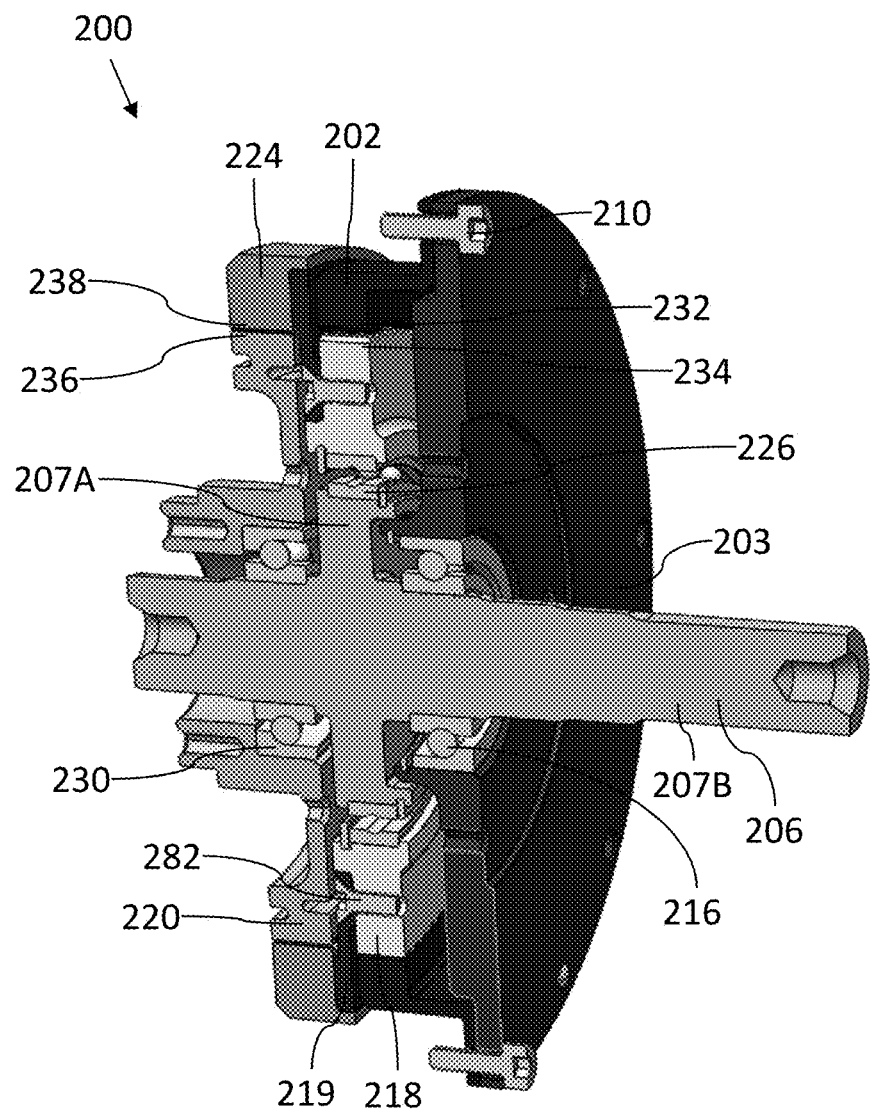
FIG. 2H is a sectional perspective view of an input end of one example aspect of circular wave drive 200.

As additionally illustrated in FIG. 2H, input cycloidal disc 218 may be connected to tie plate 219 via at least one fastener 282.

It is contemplated that circular wave drives 100 and 200 may be used in any of a variety of actuation and/or gear reduction applications, including for example: robotic actuation, mechanical actuation, aerospace actuation, or vehicle transmissions.

The circular wave drives described herein, including for example, circular wave drives 100 and 200, may include two or more stages of cycloidal gears. In one aspect, a circular wave drive may include two stages of cycloidal gears. In another aspect, a circular wave drive may include three stages of cycloidal gears. In another aspect, a circular wave drive may include more than two stages of cycloidal gears. In one aspect, a circular wave drive may include two or more stages of cycloidal gears, wherein the two or more stages of cycloidal gears are subtractive. The circular wave drive may include two stages of cycloidal gears, and the two stages may be subtractive. In one aspect, the inclusion of multiple stages of cycloidal gears may permit a circular wave drive to have high reduction ratios. In one aspect, the inclusion of multiple stages of cycloidal gears, wherein the stages are subtractive, may permit a circular wave drive to have high reduction ratios.

The reduction ratio of eccentric motion generator 206 rotational velocity to output drive element 204 rotational velocity may be calculated through the following formula:

$$\left[\frac{a}{b}\left(\frac{c-d}{c}\right) - \frac{a-b}{a}\right]^{-1}:1$$

where a=the number of gear teeth 232 of input ring gear 202;
where b=the number of gear teeth 234 of input cycloidal disc 218;
where c=the number of gear teeth 238 of output cycloidal disc 224; and
where d=the number of gear teeth 236 of primary drive gear 220.

Accordingly, where one desires a specific reduction ratio, one may design circular wave drive 200 such that the number of gear teeth of each of input ring gear 202, input cycloidal disc 218, output cycloidal disc 224, and primary drive gear 220 effect the desired reduction ratio.

Any of the aforementioned teeth may have any of a variety of gear tooth profiles, including for example, a sinusoidal tooth profile.

In one aspect, circular wave drive 200 is not reverse-drivable, and as such can only be operated in one rotational direction. In another aspect, circular wave drive 200 is reverse-drivable, and as such can be operated in more than one rotational direction.

Eccentric motion generator 206 and output drive element 204 may be oriented on opposite sides of circular wave drive 200. Alternatively, eccentric motion generator 206 and output drive element 204 may be oriented on the same side of circular wave drive 200.

FIGS. 3A-3E illustrate one example aspect of an input ring gear 302. Input ring gear may include input ring gear teeth 332 contained upon a non-compliant portion 350, at least one mounting aperture 384, a compliant wall 352, and an input ring gear mounting flange 354.

Compliant wall 352 extends between, and connects, non-compliant portion 350 and input ring gear mounting flange 354. Compliant wall 352 may extend substantially parallel to the axis of rotation of eccentric motion generator 206.

Due to the difficulty in obtaining and maintaining the necessary tolerances in the production of the circular wave drives disclosed herein, including for example within ring gear 302 and input cycloidal disc 218 (illustrated at least in FIG. 2F), obtaining and maintaining the proper backlash between the input ring gear teeth 332 and input cycloidal disc gear teeth (234 in FIG. 2F) can be very difficult. To alleviate this difficulty, input ring gear 302 may be designed as a compliant element.

A compliant element, as the term is used herein, refers to flexible mechanisms that transfer an input force and displacement at one point to an output force and displacement at another point through elastic body deformation.

Thus, compliant wall 352 permits the elastic deformation of input ring gear 302, so as to permit non-compliant portion 350 and input ring gear teeth 332, as a unit, to be displaced and achieve the desired backlash when engaging input cycloidal disc gear teeth 234. In one aspect, compliant wall 352 biases input ring gear teeth 332 into a desired relative engagement with input cycloidal disc gear teeth 234.

Non-compliant portion 350 contains input ring gear teeth 332, and has a stiffness necessary to maintain the structural integrity of input ring gear teeth 332. That is, non-compliant portion 350 and input ring gear teeth 332 are not intended to be flexible, or elastically deform, in the sense that compliant wall 352 is intended to be flexible and elastically deform.

The compliance of input ring gear 302, and elastic body deformation of compliant wall 352 may be achieved in a number of manners, including for example, varying material strengths, geometries, and thicknesses.

That is, compliant wall 352 could be a separate material from one or both of non-compliant portion 350 or mounting flange 354, wherein the material of compliant wall 352 has increased flexibility when compared to the material of non-compliant portion 350 or mounting flange 354.

Figure 3A:
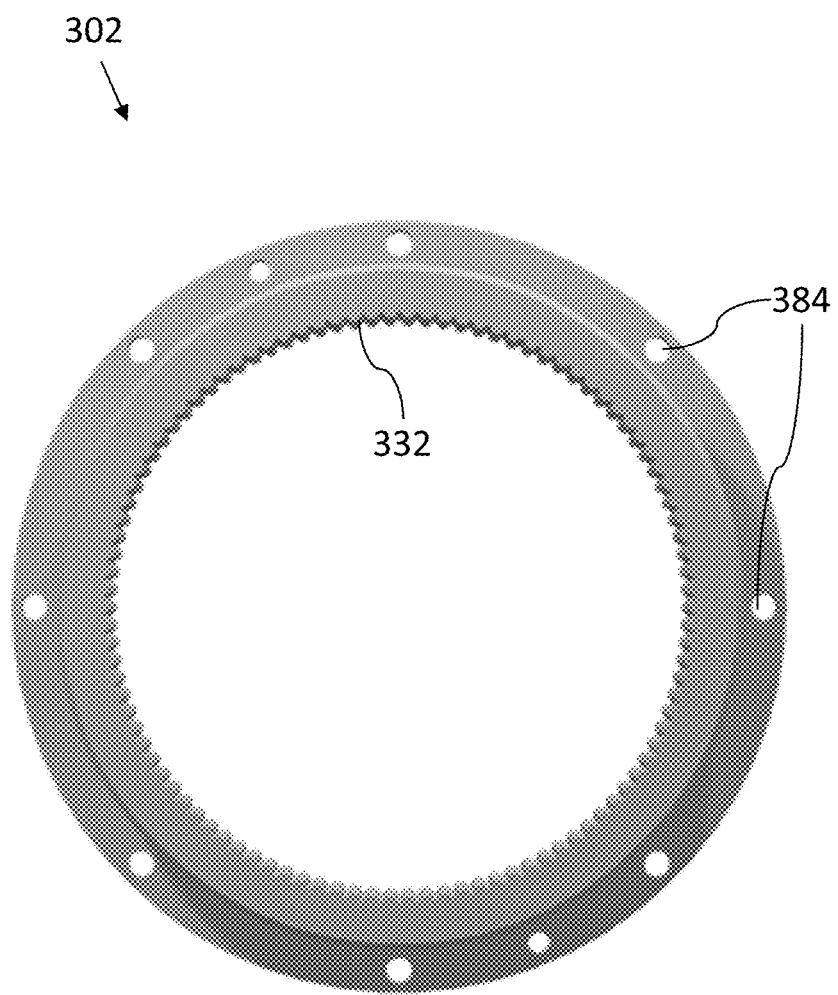
FIG. 3A is a front elevation view of one example aspect of an input ring gear 302.
Figure 3B:
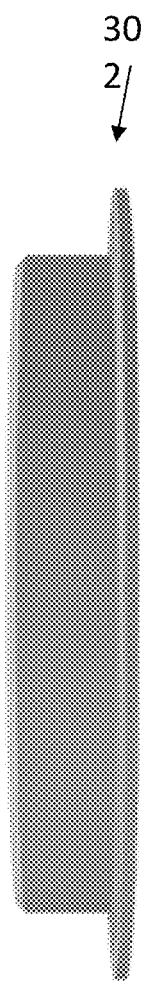
FIG. 3B is a side elevation view of one example aspect of input ring gear 302.
Figure 3C:
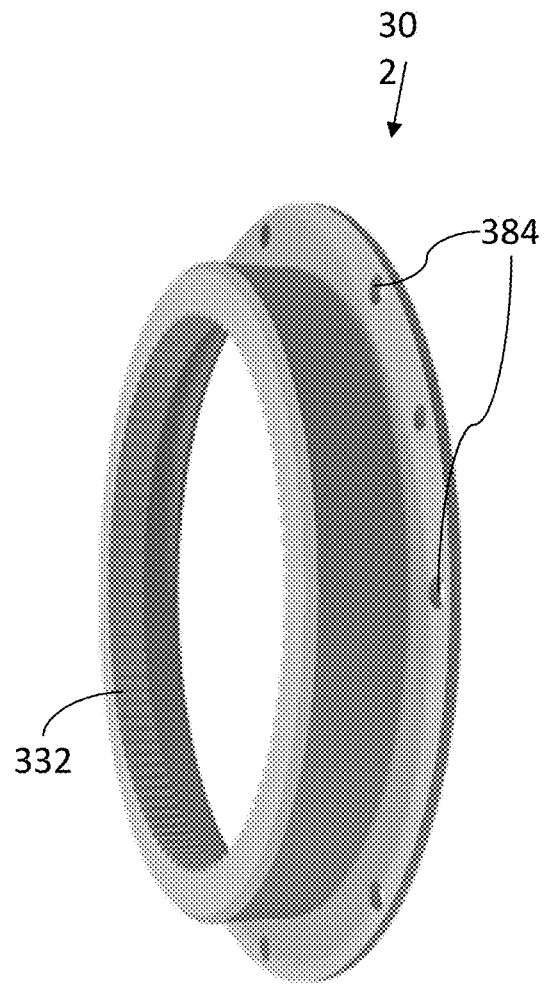
FIG. 3C is a side perspective view of one example aspect of input ring gear 302.
Figure 3D:
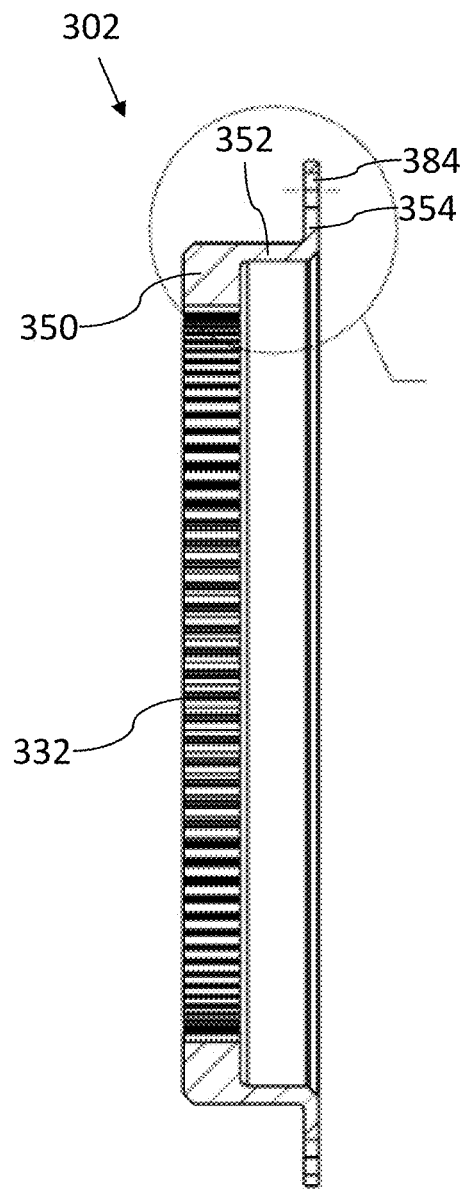
FIG. 3D is a side sectional view of one example aspect of input ring gear 302.
Figure 3E:
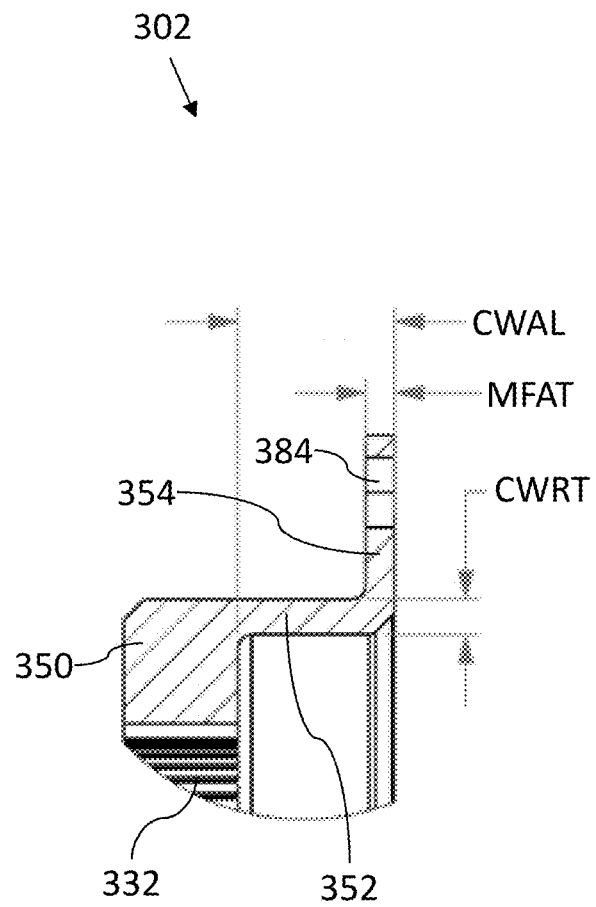
FIG. 3E is a partial side sectional view of one example aspect of input ring gear 302.

Alternatively, compliant wall 352 may be designed with specific dimensions to achieve the desired elastic deformation. These dimensions may include a compliant wall 352 radial thickness CWRT and a compliant wall 352 axial length CWAL as illustrated in FIG. 3E, which is a partial enlarged view of FIG. 3D. Mounting flange 354 may have a mounting flange axial thickness MFAT. The dimensions of compliant wall 352 may permit a bending moment in compliant wall 352 that results in the translation/deflection of input ring gear teeth 332.

To obtain the desired elastic deformation, CWRT may be exactly or about 22.7% of CWAL. CWRT may be between exactly or about 20.0% and 25.0% of CWAL. CWRT may be between exactly or about 18.0% and 27.0% of CWAL. CWRT may be between exactly or about 16.0% and 29.0% of CWAL.

MFAT may be exactly or about 18.2% of CWAL. MFAT may be between exactly or about 16.0% and 20.0% of CWAL. MFAT may be between exactly or about 14.0% and 22.0% of CWAL. MFAT may be between exactly or about 12.0% and 24.0% of CWAL.

It is understood that these relative dimensions may differ between input ring gears 302 having different materials and thus different material properties.

FIGS. 4A-4F illustrate example aspects of a primary drive gear 420. Primary drive gear 420 may include external primary drive gear teeth 436, a compliant radial wall 460, a compliant rib 466, a first relief groove 461, a second relief groove 462, at least one mounting aperture 463, a central bore 464, and a hub 467.

As illustrated in assembled circular wave drive 200, hub 467 may be encircled by primary drive gear/housing bearing 268. Hub 467 may include at least one mounting aperture 463 configured to receive at least one fastener 280 to connect primary drive gear 420 to output drive element 204. Eccentric motion generator 206 may extend through central bore 464 in the assembled circular wave drive 200.

Compliant radial wall 460 may extend radially outwardly from hub 467. Additionally, external primary drive gear teeth 436 may be at least somewhat cantilevered relative to compliant radial wall 460 (that is, offset axially), and may be connected to compliant radial wall 460 by compliant rib 466 (oriented radially outwardly from compliant radial wall 460), which is formed by and flanked by first relief groove 461 and second relief groove 462.

Due to the difficulty in obtaining and maintaining the necessary tolerances in the production of the circular wave drives disclosed herein, including for example within primary drive gear 420 and output cycloidal disc 224 (illustrated at least in FIG. 2F), obtaining and maintaining the proper backlash between the external primary drive gear teeth 436 and internal output cycloidal disc teeth (238 in FIG. 2F) can be very difficult. To alleviate this difficulty, primary drive gear 420 may be designed as a compliant element.

Primary drive gear 420 may include two compliant elements, including at least one of compliant radial wall 460 and compliant rib 466. Each of compliant radial wall 460 and compliant rib 466 may permit elastic deformation of external primary drive gear teeth 436 via the material properties, material thicknesses, and geometries of each. In one aspect, compliant radial wall 460 and compliant rib 466 cause external primary drive gear teeth 436 to be biased into a desired relative engagement with output cycloidal disc teeth 238.

Compliant radial wall 460 may have a reduced thickness (in the axial direction) to allow for a bending moment in compliant radial wall 460, which allows for translation/deflection of external primary drive gear teeth 436.

Compliant rib 466 may have a reduced thickness, as a result of the inclusion of one or more relief groove, including for example first relief groove 461 and/or second relief groove 462. Additionally, the orientation of relief grooves 461, 462 permit external primary drive gear teeth 436 to "rock" (that is, to deform from a cylindrical shape to a conical shape) in response to forces applied to external primary drive gear teeth 436, to achieve the necessary backlash.

It is understood that reduced material thickness as described above results in reduced strength within the reduced thickness areas.

Figure 4A:
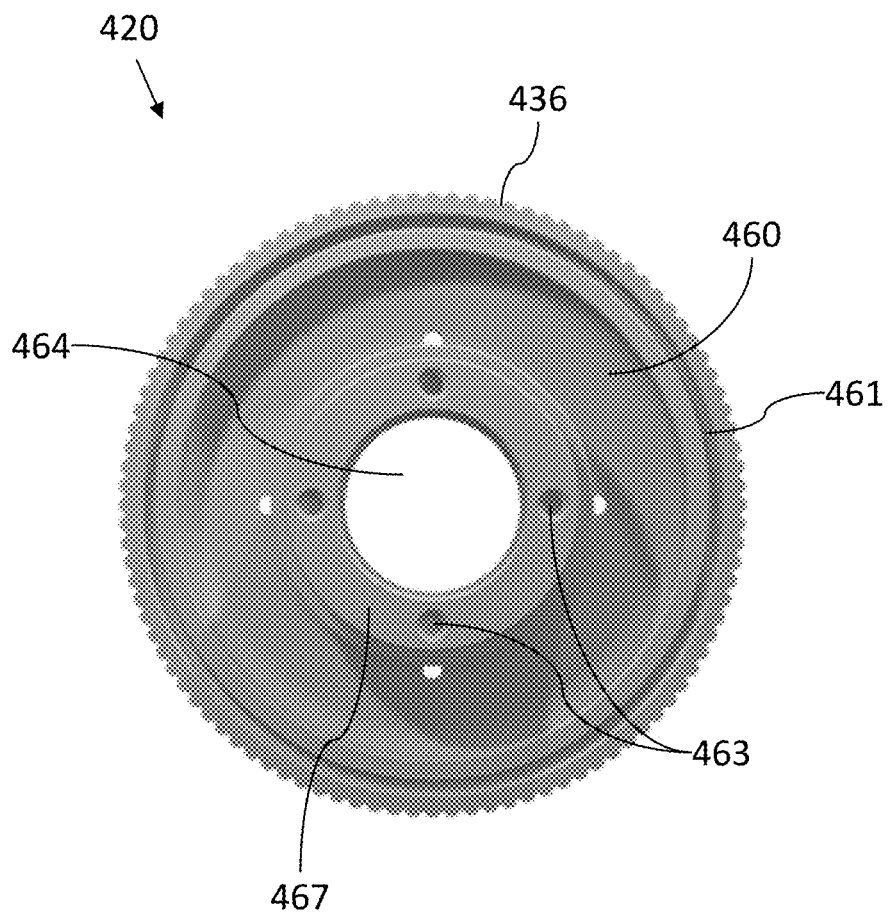
FIG. 4A is a first side elevation view of one example aspect of a primary drive gear 420.
Figures 4B, 4C:
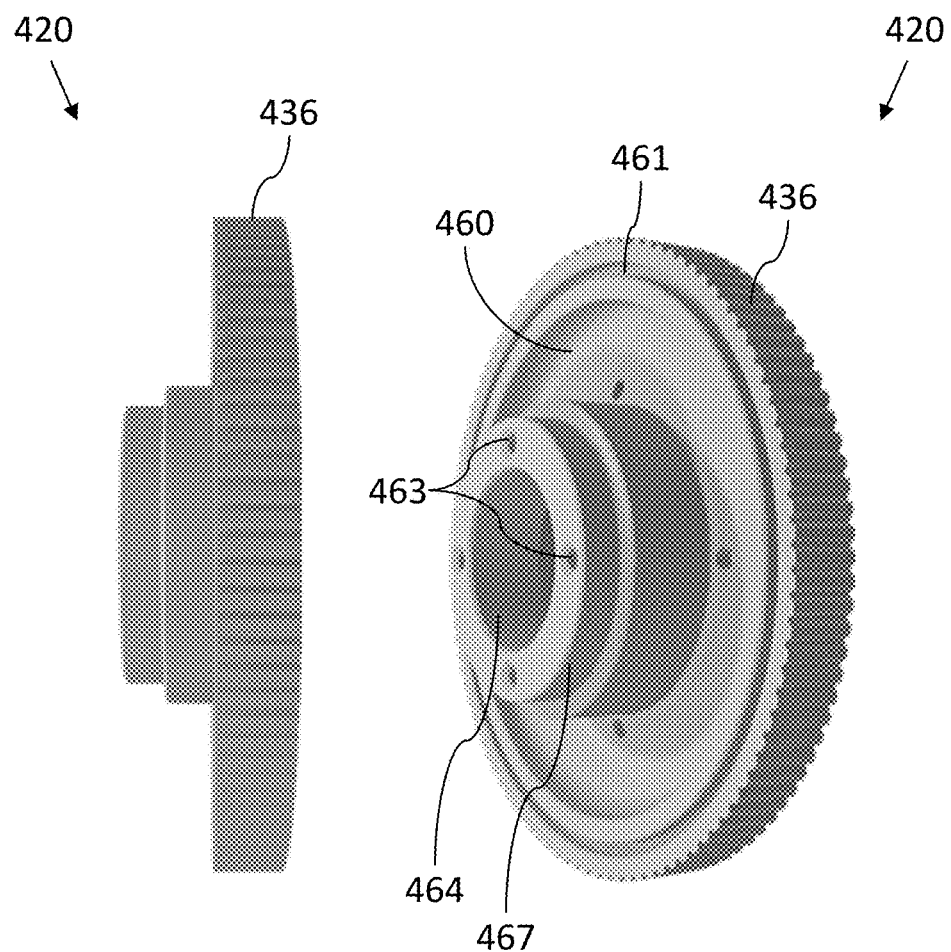
FIG. 4B is a side elevation view of one example aspect of primary drive gear 420.
FIG. 4C is a first side perspective view of one example aspect of primary drive gear 420.
Figure 4D:
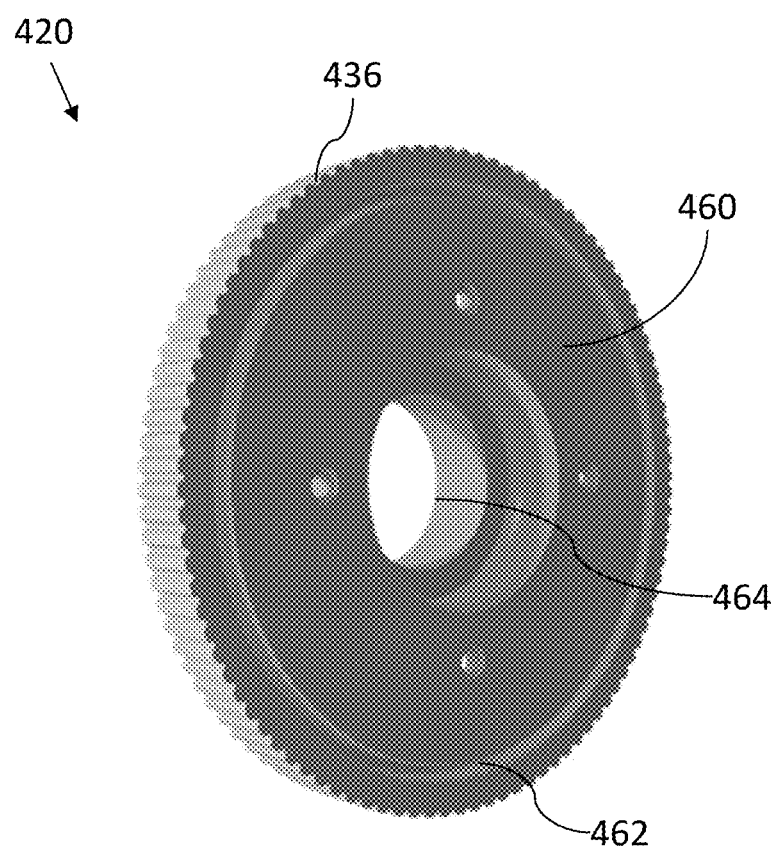
FIG. 4D is a second side perspective view of one example aspect of primary drive gear 420.
Figure 4E:
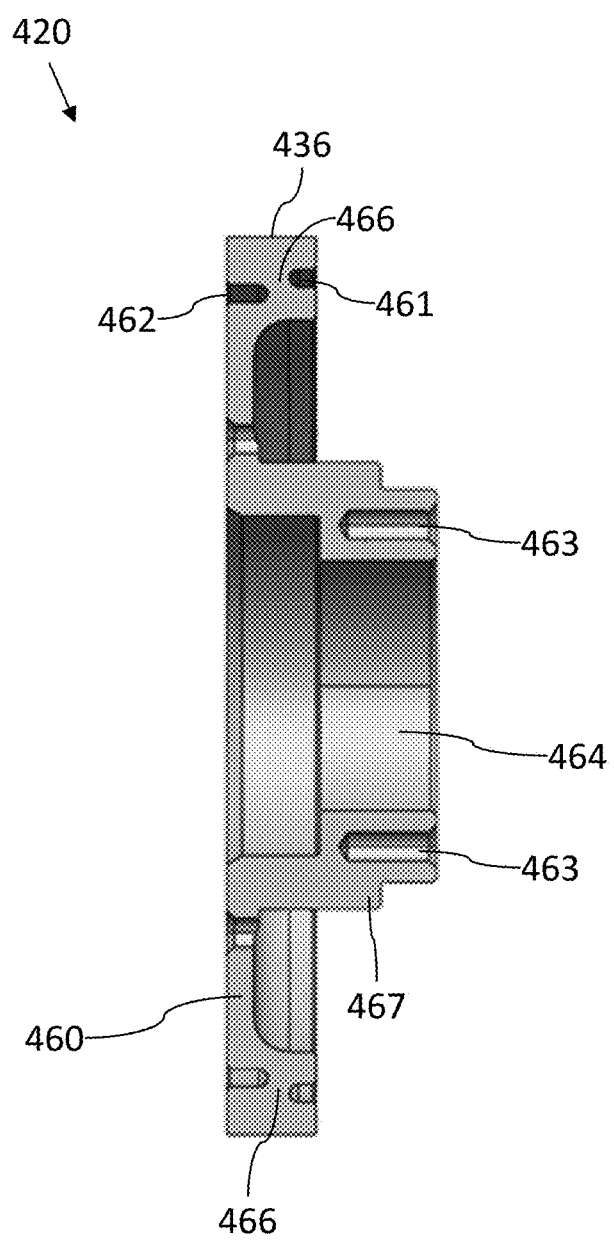
FIG. 4E is a side sectional view of one example aspect of primary drive gear 420.
Figure 4F:
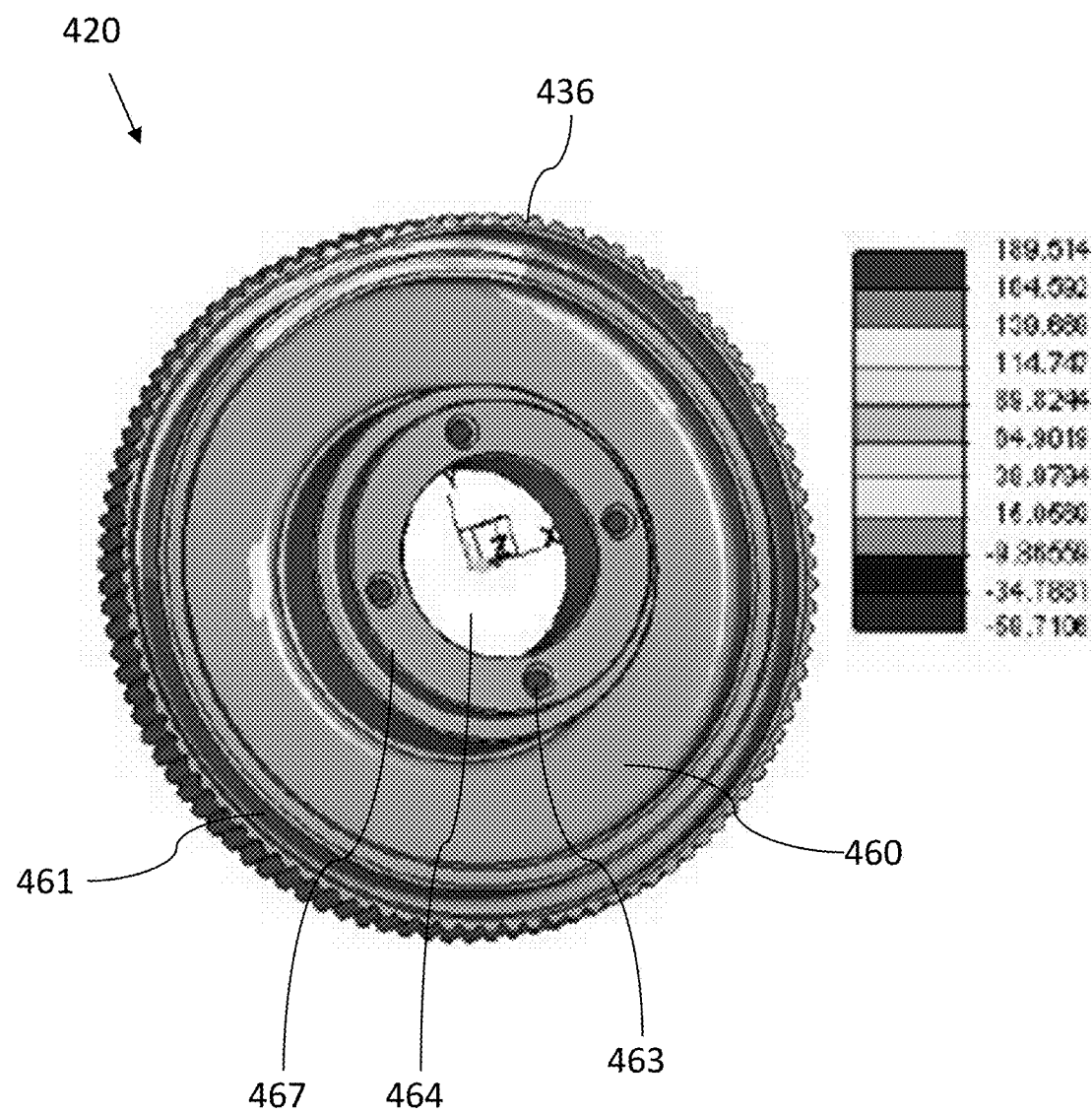
FIG. 4F is a first side perspective view of one example aspect of primary drive gear 420 illustrating the elastic deformation of primary drive gear 420.

FIG. 4F illustrates the possible elastic deflection of external primary drive gear teeth 436 in response to a force applied to external primary drive gear teeth 436.

Figure 5A:
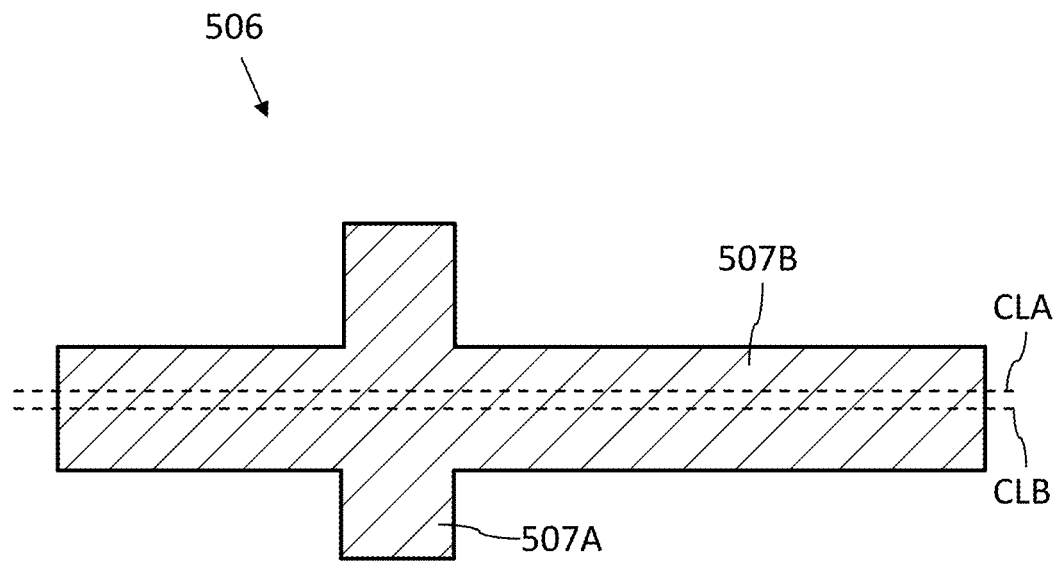
FIG. 5A is a side sectional view of one example aspect of an eccentric motion generator 506.
Figure 5B:
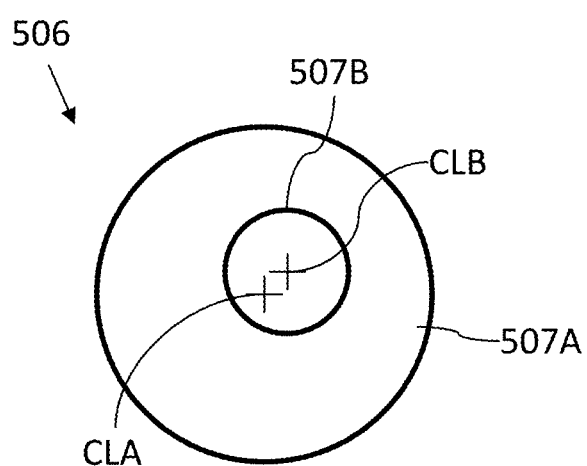
FIG. 5B is a front view of one example aspect of eccentric motion generator 506.

FIGS. 5A and 5B illustrate one example aspect of an eccentric motion generator 506. Eccentric motion generator 506 includes an eccentric portion 507A and a non-eccentric portion 507B. Eccentric portion 507A has a centerline CLA, while non-eccentric portion 507B has a centerline CLB. Centerline CLA and centerline CLB may be parallel to, and offset from, one another.

In one aspect, eccentric motion generator 506 may be constrained such that it is able to rotate about centerline CLB of non-eccentric portion 507B. In this aspect, eccentric portion 507A rotates with non-eccentric portion 507B, but the rotation of eccentric portion 507A is eccentric. In this manner, eccentric motion generator 506 may convert a rotational input into an eccentric motion.

FIG. 6 is a flowchart illustrating an example method 600 for determining a reduction radio of a circular wave drive. Method 600 includes selecting a desired reduction ratio for the circular wave drive (step 610). Method 600 further includes providing a circular wave drive including: an input ring gear having internal gear teeth (a); an input cycloidal disc having external gear teeth (b), the input cycloidal disc gear teeth at least partially engaging the input ring gear teeth; a primary drive gear having external gear teeth (d), the primary drive gear fixed to the input cycloidal disc; an output cycloidal disc having internal gear teeth (c), and the output cycloidal disc teeth at least partially engaging the primary drive gear teeth (step 620). Method 600 further includes calculating a reduction ratio using the equation: Reduction Ratio=

$$\left[\frac{a}{b}\left(\frac{c-d}{c}\right) - \frac{a-b}{a}\right]^{-1} :1$$

where a=the number of gear teeth of input ring gear 102; 202;
where b=the number of gear teeth of input cycloidal disc 118; 218;
where c=the number of gear teeth of output cycloidal disc 124; 224; and
where d=the number of gear teeth of primary drive gear 120; 220 (step 530).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A circular wave drive, comprising:
 a compliant input ring gear having an inner surface,
  wherein the compliant input ring gear includes internal input ring gear teeth oriented on the inner surface,
  wherein the compliant input ring gear includes a non-compliant portion containing the input ring gear teeth, and an input ring gear mounting flange, wherein the non-compliant portion and the input ring gear mounting flange are connected by a compliant wall,
  wherein the compliant wall has a radial thickness and an axial length, and wherein the radial thickness is between about 16.0% and 29.0% of the axial length;
 an input cycloidal disc having an outer surface,
  wherein the input cycloidal disc includes external input cycloidal disc gear teeth oriented on the outer surface, and
  wherein the external input cycloidal disc gear teeth at least partially engage the internal input ring gear teeth;
 a compliant primary drive gear having an outer surface,
  wherein the primary drive gear includes external primary drive gear teeth oriented on the outer surface;
 an eccentric motion generator,
  wherein the eccentric motion generator includes an eccentric portion and a non-eccentric portion and wherein a centerline of the eccentric portion and the non-eccentric portion are offset from one another; and
 an output cycloidal disc having an inner surface,
  wherein the output cycloidal disc includes internal output cycloidal disc teeth oriented on the inner surface, and wherein the internal output cycloidal disc teeth at least partially engage the external primary drive gear teeth.

2. The circular wave drive of claim 1, further comprising an output drive element connected to the primary drive gear.

3. The circular wave drive of claim 1, wherein the input cycloidal disc is connected to the output cycloidal disc.

4. The circular wave drive of claim 1, wherein the internal input ring gear teeth and the external input cycloidal disc gear teeth each have a sinusoidal tooth profile.

5. The circular wave drive of claim 1, wherein the external primary drive gear teeth and the internal output cycloidal disc teeth each have a sinusoidal tooth profile.

6. The circular wave drive of claim 1, wherein the eccentric motion generator is rotatably connected to the input cycloidal disc via an eccentric motion generator/input cycloidal disc bearing.

7. A circular wave drive, comprising:
a compliant input ring gear having an inner surface,
wherein the compliant input ring gear includes internal input ring gear teeth oriented on the inner surface, and
wherein the compliant input ring gear includes a non-compliant portion containing the input ring gear teeth, and an input ring gear mounting flange, wherein the non-compliant portion and the input ring gear mounting flange are connected by a compliant wall;
an input cycloidal disc having an outer surface,
wherein the input cycloidal disc includes external input cycloidal disc gear teeth oriented on the outer surface, and
wherein the external input cycloidal disc gear teeth at least partially engage the internal input ring gear teeth;
a compliant primary drive gear having an outer surface,
wherein the primary drive gear includes external primary drive gear teeth oriented on the outer surface, and
wherein the primary drive gear includes a hub, a compliant radial wall extending radially outwardly from the hub, and a complaint rib formed by at least one of a first relief groove or a second relief groove, and wherein the compliant rib connects the external primary drive gear teeth to the compliant radial wall;
an eccentric motion generator,
wherein the eccentric motion generator includes an eccentric portion and a non-eccentric portion and wherein a centerline of the eccentric portion and the non-eccentric portion are offset from one another; and
an output cycloidal disc having an inner surface,
wherein the output cycloidal disc includes internal output cycloidal disc teeth oriented on the inner surface, and
wherein the internal output cycloidal disc teeth at least partially engage the external primary drive gear teeth.

8. The circular wave drive of claim 7, further comprising an output drive element connected to the primary drive gear.

9. The circular wave drive of claim 7, wherein the input cycloidal disc is connected to the output cycloidal disc.

10. The circular wave drive of claim 7, wherein the internal input ring gear teeth and the external input cycloidal disc gear teeth each have a sinusoidal tooth profile.

11. The circular wave drive of claim 7, wherein the external primary drive gear teeth and the internal output cycloidal disc teeth each have a sinusoidal tooth profile.

12. The circular wave drive of claim 7, wherein the eccentric motion generator is rotatably connected to the input cycloidal disc via an eccentric motion generator/input cycloidal disc bearing.

13. The circular wave drive of claim 7, wherein the compliant wall has a radial thickness and an axial length, and wherein the radial thickness is between about 16.0% and 29.0% of the axial length.

14. The circular wave drive of claim 7, wherein the compliant rib is formed by both a first relief groove and a second relief groove.

15. A circular wave drive, comprising:
a compliant input ring gear having an inner surface,
wherein the compliant input ring gear includes internal input ring gear teeth oriented on the inner surface;
an input cycloidal disc having an outer surface,
wherein the input cycloidal disc includes external input cycloidal disc gear teeth oriented on the outer surface, and
wherein the external input cycloidal disc gear teeth at least partially engage the internal input ring gear teeth;
a compliant primary drive gear having an outer surface,
wherein the primary drive gear includes external primary drive gear teeth oriented on the outer surface,
wherein the primary drive gear includes a hub, a compliant radial wall extending radially outwardly from the hub, and a complaint rib formed by at least one of a first relief groove or a second relief groove, and wherein the compliant rib connects the external primary drive gear teeth to the compliant radial wall,
wherein the compliant rib is formed by both a first relief groove and a second relief groove;
an eccentric motion generator,
wherein the eccentric motion generator includes an eccentric portion and a non-eccentric portion and wherein a centerline of the eccentric portion and the non-eccentric portion are offset from one another; and
an output cycloidal disc having an inner surface,
wherein the output cycloidal disc includes internal output cycloidal disc teeth oriented on the inner surface, and
wherein the internal output cycloidal disc teeth at least partially engage the external primary drive gear teeth.

16. The circular wave drive of claim 15, further comprising an output drive element connected to the primary drive gear.

17. The circular wave drive of claim 15, wherein the input cycloidal disc is connected to the output cycloidal disc.

18. The circular wave drive of claim 15, wherein the internal input ring gear teeth and the external input cycloidal disc gear teeth each have a sinusoidal tooth profile.

19. The circular wave drive of claim 15, wherein the external primary drive gear teeth and the internal output cycloidal disc teeth each have a sinusoidal tooth profile.

20. The circular wave drive of claim 15, wherein the eccentric motion generator is rotatably connected to the input cycloidal disc via an eccentric motion generator/input cycloidal disc bearing.

* * * * *